US012759573B2

(12) United States Patent
Jean et al.

(10) Patent No.: US 12,759,573 B2
(45) Date of Patent: Oct. 13, 2026

(54) COLLISION WARNING SYSTEM AND METHOD

(71) Applicant: MiTAC Digital Technology Corporation, Taoyuan City (TW)

(72) Inventors: Jyh-Yang Jean, Taoyuan City (TW); Hsiao-Yang Lee, Taoyuan City (TW); Chung-Chiang Dai, Taoyuan City (TW)

(73) Assignee: MITAC DIGITAL TECHNOLOGY CORPORATION, Taoyuan City (TW)

( * ) Notice: Subject to any disclaimer, the term of this patent is extended or adjusted under 35 U.S.C. 154(b) by 64 days.

(21) Appl. No.: 18/809,305

(22) Filed: Aug. 19, 2024

(65) Prior Publication Data

US 2025/0065901 A1 Feb. 27, 2025

(30) Foreign Application Priority Data

Aug. 21, 2023 (TW) ................................ 112131304

(51) Int. Cl.
*B60Q 1/00* (2006.01)
*B60W 30/16* (2020.01)
(Continued)

(52) U.S. Cl.
CPC ............ *B60W 50/14* (2013.01); *B60W 30/16* (2013.01); *G06V 20/584* (2022.01);
(Continued)

(58) Field of Classification Search
CPC ............... G01N 33/0075; G01N 15/06; G01N 33/0006; G01N 35/00722;
(Continued)

(56) References Cited

U.S. PATENT DOCUMENTS 7,209,221 B2 * 4/2007 Breed .................. G01S 17/931
356/28
8,633,810 B2 * 1/2014 Luo ...................... H04N 23/698
340/436
(Continued)

*Primary Examiner* — Toan N Pham
(74) *Attorney, Agent, or Firm* — Panitch Schwarze Belisario & Nadel LLP

(57) ABSTRACT

A collision warning method is to be implemented by a collision warning system and includes: in response to determining that a neighboring vehicle is directly behind a subject vehicle based on a video, outputting a first warning notification in response to determining that a first warning condition related to a forward-backward distance threshold is satisfied; and in response to determining that the neighboring vehicle is obliquely behind the subject vehicle, generating a two-dimensional top-view image that presents a relative position between the subject vehicle and the neighboring vehicle, overlapping a blind-spot distribution pattern matching the neighboring vehicle on the two-dimensional top-view image, and outputting a second warning notification in response to determining that a second warning condition related to a left-right distance threshold and a blind-spot coverage threshold is satisfied based on the two-dimensional top-view image with the blind-spot distribution pattern overlapped thereon.

20 Claims, 3 Drawing Sheets

(51) Int. Cl.
*B60W 50/14* (2020.01)
*G06V 20/56* (2022.01)
*G06V 20/58* (2022.01)
*G10L 15/08* (2006.01)

(52) U.S. Cl.
CPC ............ *G06V 20/588* (2022.01); *G10L 15/08* (2013.01); *B60W 2420/403* (2013.01); *B60W 2540/21* (2020.02); *B60W 2552/53* (2020.02); *B60W 2554/4023* (2020.02); *B60W 2554/801* (2020.02); *B60W 2554/802* (2020.02); *G10L 2015/088* (2013.01)

(58) Field of Classification Search
CPC ......... G01N 2001/2223; G01N 15/075; G01N 1/26; G01N 2001/2297; G01N 2015/0046; A61L 2209/111
See application file for complete search history.

(56) References Cited

U.S. PATENT DOCUMENTS

| | | | | |
|---|---|---|---|---|
| 9,555,803 | B2 * | 1/2017 | Pawlicki | G01S 11/12 |
| 10,553,116 | B2 * | 2/2020 | Yi | G06V 20/58 |
| 2004/0148063 | A1 * | 7/2004 | Patchell | B60T 17/22<br>701/1 |
| 2016/0252610 | A1 * | 9/2016 | Smith | G01S 7/411<br>342/27 |
| 2024/0416899 | A1 * | 12/2024 | Barrera | G06V 10/82 |

* cited by examiner

COLLISION WARNING SYSTEM AND METHOD

CROSS-REFERENCE TO RELATED APPLICATION

This application claims priority to Taiwanese Invention Patent Application No. 112131304, filed on Aug. 21, 2023, and incorporated by reference herein in its entirety.

FIELD

The disclosure relates to a collision warning system and a collision warning method, and more particularly to a collision warning system and a collision warning method that are adapted to be used on a vehicle.

BACKGROUND

For a large-size vehicle (e.g., a bus, a heavy truck, a tractor trailer, and so on), there are a lot of blind spots, i.e., areas around the large-size vehicle that cannot be directly seen by a driver of the large-size vehicle when driving, due to a relatively higher position of the driver's seat where the driver sits and a relatively longer length of a vehicle body of the large-size vehicle. The existence of blind spots may cause severe traffic accidents. According to statistics, there is on average only 0.6 to one second of effective reaction time for two drivers respectively in two vehicles that are about to collide to effectively react before collision occurs.

SUMMARY

Therefore, an object of the disclosure is to provide a collision warning system and a collision warning method.

According to one aspect of the disclosure, the collision warning system is adapted to be used on a subject vehicle. The collision warning system includes a storage, a recording device, an output device, and a processor electrically connected to the storage, the recording device and the output device.

The storage is configured to store a forward-backward distance threshold, at least one left-right distance threshold, at least one blind-spot coverage threshold, a plurality of blind-spot distribution patterns and a vehicle-size reference dataset.

The recording device is disposed on the subject vehicle, and is configured to record a view behind the subject vehicle to obtain a video that contains image data.

The processor is configured to determine whether there is a neighboring vehicle that is a large-size vehicle in the video based on the image data. In response to determining that there is a neighboring vehicle that is a large-size vehicle in the video, the processor is configured to determine whether the neighboring vehicle is directly behind the subject vehicle or obliquely behind the subject vehicle based on the image data of the video. In response to determining that the neighboring vehicle is directly behind the subject vehicle, the processor is configured to determine whether a first warning condition related to the forward-backward distance threshold is satisfied based on the image data of the video, and to control the output device to output a first warning notification in response to determining that the first warning condition is satisfied. In response to determining that the neighboring vehicle is obliquely behind the subject vehicle, the processor is configured to generate, based on the vehicle-size reference dataset and the image data of the video, a two-dimensional top-view image that presents a relative position between the subject vehicle and the neighboring vehicle, to select one of the blind-spot distribution patterns that matches the neighboring vehicle, to overlap said one of the blind-spot distribution patterns thus selected on the two-dimensional top-view image at a position of the two-dimensional top-view image that corresponds to the neighboring vehicle, to determine whether a second warning condition is satisfied based on the two-dimensional top-view image with said one of the blind-spot distribution patterns overlapped thereon, the second warning condition being related to said at least one left-right distance threshold and said at least one blind-spot coverage threshold, and to control the output device to output a second warning notification in response to determining that the second warning condition is satisfied.

According to another aspect of the disclosure, the collision warning method is to be implemented by the collision warning system that is previously described. The collision warning method includes steps of:

- determining whether there is a neighboring vehicle that is a large-size vehicle in the video based on the image data;
- in response to determining that there is a neighboring vehicle that is a large-size vehicle in the video, determining whether the neighboring vehicle is directly behind the subject vehicle or obliquely behind the subject vehicle based on the image data of the video;
- in response to determining that the neighboring vehicle is directly behind the subject vehicle, determining whether a first warning condition related to the forward-backward distance threshold is satisfied based on the image data of the video, and controlling the output device to output a first warning notification in response to determining that the first warning condition is satisfied; and
- in response to determining that the neighboring vehicle is obliquely behind the subject vehicle,
  - generating, based on the vehicle-size reference dataset and the image data of the video, a two-dimensional top-view image that presents a relative position between the subject vehicle and the neighboring vehicle,
  - selecting one of the blind-spot distribution patterns that matches the neighboring vehicle,
  - overlapping said one of the blind-spot distribution patterns thus selected on the two-dimensional top-view image at a position of the two-dimensional top-view image that corresponds to the neighboring vehicle,
  - determining whether a second warning condition is satisfied based on the two-dimensional top-view image with said one of the blind-spot distribution patterns overlapped thereon, the second warning condition being related to said at least one left-right distance threshold and said at least one blind-spot coverage threshold, and
  - controlling the output device to output a second warning notification in response to determining that the second warning condition is satisfied.

According to still another aspect of the disclosure, the collision warning method is to be implemented by a collision warning system that is adapted to be used on a subject vehicle. The collision warning system includes a storage, a recording device, an output device and a processor electrically connected to the storage, the recording device and the output device. The storage stores at least one left-right distance threshold and at least one blind-spot coverage threshold. The recording device is disposed on the subject vehicle, and records a view behind the subject vehicle to obtain a video that contains image data. The collision warning method includes steps of:

the processor determining whether there is a neighboring vehicle that is a large-size vehicle in the video based on the image data;

in response to determining that there is a neighboring vehicle that is a large-size vehicle in the video, the processor determining whether the neighboring vehicle is obliquely behind the subject vehicle based on the image data of the video; and in response to determining that the neighboring vehicle is obliquely behind the subject vehicle, the processor determining, based on the image data of the video, a relative distance between the subject vehicle and the neighboring vehicle, the processor determining whether a second warning condition is satisfied based on the relative distance of the subject vehicle, the second warning condition being related to said at least one left-right distance threshold and said at least one blind-spot coverage threshold, and the processor controlling the output device to output a second warning notification in response to determining that the second warning condition is satisfied.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
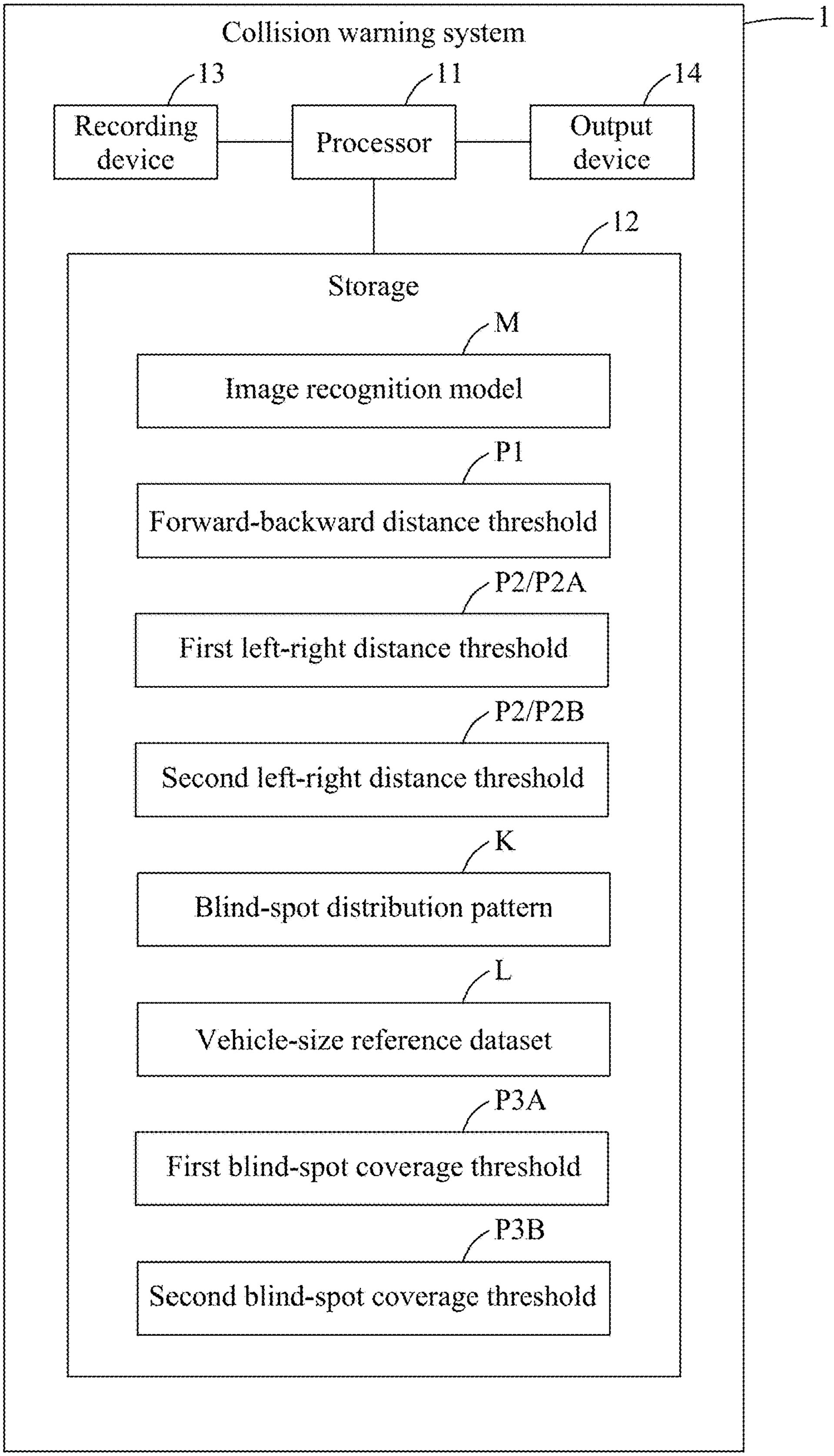
FIG. 1 is a block diagram illustrating a collision warning system according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted before the present disclosure is described in detail. If not specifically defined, "electrical connection" in the specification may refer to both "wired electrical connection" between a plurality of electronic apparatuses/devices/elements implemented by conductive materials that are connected to each other and "wireless connection" for uni-/bi-directional wireless signal transmission through wireless communication technology. Moreover, "electrical connection" described in the specification may also refer to a "direct electrical connection" formed by a plurality of electronic equipment/devices/elements directly connected to each other, and "indirect electrical connection" formed by other electronic equipment/devices/elements indirectly connected to each other.

Referring to FIG. 1, an embodiment of a collision warning system 1 according to the disclosure is illustrated. The collision warning system 1 is adapted to be used on a subject vehicle. In this embodiment, the subject vehicle is implemented to be a bike such as a motorcycle or a bicycle, but is not limited thereto and may vary in other embodiments. For example, the subject vehicle is implemented to be a car in other embodiments. The collision warning system 1 may be implemented by a dashboard camera (dashcam) or a car digital video recorder (DVR) that has functions of image recognition and safety warning and alert. It should be noted that in one embodiment, the collision warning system 1 is manufactured for sales independently from the subject vehicle, and is mounted on the subject vehicle after the subject vehicle has been delivered from a factory. However, implementation of the collision warning system 1 is not limited to the disclosure herein and may vary in other embodiments. For example, the collision warning system 1 may be implemented to be integrated into the subject vehicle as a system for driving assistance and driving safety of the subject vehicle, rather than implemented as an independent electronic device (e.g., a dashcam or a car DVR).

The collision warning system 1 includes a storage 12, a recording device 13, an output device 14, and a processor 11 that is electrically connected to the storage 12, the recording device 13 and the output device 14.

The processor 11 may be implemented by a central processing unit (CPU), a graphics processing unit (GPU), a microprocessor, a micro control unit (MCU), a system on a chip (SoC), or any circuit configurable/programmable in a software manner and/or hardware manner to implement functionalities discussed in this disclosure.

The storage 12 may be implemented by random access memory (RAM), double data rate synchronous dynamic random access memory (DDR SDRAM), read only memory (ROM), programmable ROM (PROM), flash memory, a memory card, a hard disk drive (HDD), a solid state disk (SSD), electrically-erasable programmable read-only memory (EEPROM) or any other volatile/non-volatile memory devices, but is not limited thereto.

The recording device 13 may be implemented to at least include a camera lens, an image sensor and a microphone, and is capable of recording a video (including audio). The recording device 13 is disposed on the subject vehicle, and is configured to record a view behind the subject vehicle to obtain a video that contains image data and audio data. In some embodiments, the recording device 13 does not include a microphone and is incapable of recording audio, so a video obtained by the recording device 13 contains only image data.

The output device 14 may be implemented by a vibrator, a speaker, a liquid-crystal display (LCD), a light-emitting diode (LED) display, a plasma display panel, or a projection display. In a scenario where the subject vehicle is implemented to be a motorcycle or a bicycle, the output device 14 is adapted to be disposed on a grip of the motorcycle or the bicycle, or is adapted to be disposed on a helmet of a cyclist who is riding the motorcycle or the bicycle. In a scenario where the subject vehicle is implemented to be a car and the output device 14 is implemented to be a vibrator, the output device 14 is exemplarily disposed on a steering wheel of the car. In order to ensure that the processor 11 receives the video obtained by the recording device 13 as soon as possible, in one embodiment, the processor 11, the storage 12 and the recording device 13 are disposed together on the subject vehicle, and the processor 11 and the recording device 13 are connected by a wired electrical connection, but is not limited thereto.

The storage 12 is configured to store a forward-backward distance threshold (P1), at least one left-right distance threshold (P2), at least one blind-spot coverage threshold, a plurality of blind-spot distribution patterns (K) and a vehicle-size reference dataset (L). In one embodiment, said at least one left-right distance threshold (P2) is different from the forward-backward distance threshold (P1). As shown in FIG. 1, said at least one left-right distance threshold (P2) includes a first left-right distance threshold (P2A) and a second left-right distance threshold (P2B) that is greater than the first left-right distance threshold (P2A); said at least one blind-spot coverage threshold includes a first blind-spot coverage threshold (P3A) and a second blind-spot coverage threshold (P3B) that is less than the first blind-spot coverage threshold (P3A). Each of the blind-spot distribution patterns (K) defines, for a respective one of various types of large-size vehicles (e.g., a bus, a heavy truck, a tractor trailer, and so on), blind spots surrounding the respective one of various types of large-size vehicles. The vehicle-size reference dataset (L) contains data that is related to profiles and sizes of the subject vehicle and the various types of large-size vehicles, such as a width and/or a height of a front portion of a vehicle, a width and/or a height of a windshield of a vehicle, a width of a single headlight of a vehicle, an inter-headlight distance between two headlight of a vehicle, a length of a vehicle, a diameter (may be an inner diameter or an outer diameter) of a tire of a vehicle, a size of a single feature of appearance of a vehicle, a relative position between two features of appearance of a vehicle, and so on.

It is worth to note that the forward-backward distance threshold (P1) is related to a safety distance by which the subject vehicle should keep apart from a rear large-size vehicle directly behind the subject vehicle while the subject vehicle is stationary so that the subject vehicle is not in a blind spot ahead of the rear large-size vehicle. Each of the first left-right distance threshold (P2A) and the second left-right distance threshold (P2B) is related to a safety distance by which the subject vehicle should keep apart from a side large-size vehicle at the left or the right of the subject vehicle while being stationary. Each of the first blind-spot coverage threshold (P3A) and the second blind-spot coverage threshold (P3B) is related to a ratio of an area of a part of a blind spot occupied by the subject vehicle to an area of the whole of the blind spot. The first left-right distance threshold (P2A) and the first blind-spot coverage threshold (P3A) are used to assess a condition that the subject vehicle is within a blind spot around a side large-size vehicle when the side large-size vehicle is to the left or the right of the subject vehicle, wherein the blind spot may be attributed to obstruction of a view of a driver of the side large-size vehicle by a front pillar or a center pillar of the side large-size vehicle, or to a limited view through a rearview mirror of the side large-size vehicle. The second left-right distance threshold (P2B) and the second blind-spot coverage threshold (P3B) are used to assess a condition that the subject vehicle is in a dangerous region where the side large-size vehicle may crash into the subject vehicle due to a difference of radius between inner wheels of the side large-size vehicle. In one embodiment, the forward-backward distance threshold (P1) is 1.6 meters, the first left-right distance threshold (P2A) is 2 meters, the second left-right distance threshold (P2B) is 4 meters, the first blind-spot coverage threshold (P3A) is 60%, and the second blind-spot coverage threshold (P3B) is 40%. It should be noted that values of the forward-backward distance threshold (P1), the first left-right distance threshold (P2A), the second left-right distance threshold (P2B), the first blind-spot coverage threshold (P3A) and the second blind-spot coverage threshold (P3B) are not limited to the disclosure herein and may vary in other embodiments based on practical needs. A driver of the subject vehicle may be notified according to any one of results of the aforementioned assessments.

The storage 12 is configured to further store an image recognition model (M) that is realized by using machine learning techniques (e.g., deep learning techniques) and that can be loaded by the processor 11 for operation. The image recognition model (M) is trained by using a plurality of training pictures each of which is at least related to one of the various types of large-size vehicles and road surface markings on roads.

Specifically, the training pictures related to the various types of large-size vehicles are captured from various camera angles and from various shooting distances, and contain various perspective views (e.g., a front view, an oblique view, a side view, and so on) of the various types of large-size vehicles. The image recognition model (M) is trained for identifying features of appearances of the various types of large-size vehicles. Each of the features of appearances of the various types of large-size vehicles may be related to a front view or a side view of one of the various types of large-size vehicles. For example, the feature related to a front view of a large-size vehicle may contain shapes and relative positions of components (e.g., a windshield, a rearview mirror, a turn signal, a headlight, a speed indicator, and so on) at a front portion of the large-size vehicle; the feature related to a side view of the large-size vehicle may contain shapes and relative positions of components (e.g., car doors, car windows, wheels, lateral protective devices, a dump box, a bucket, an open-topped container, and so on) at a non-front portion of the large-size vehicle. In this way, for an image or a video that shows at least one portion (e.g., the front portion or the non-front portion) of the large-size vehicle, the image recognition model (M) that has been trained up can be utilized to identify the large-size vehicle in the image or the video. One of the training pictures related to road surface markings on roads is exemplarily a screenshot of a video that shows at least one of road surface marking (e.g., a directional dividing line, a no-overtaking sign, a no-lane-change sign, a dividing line, a lane line, and so on) which defines a lane on a road, but is not limited thereto. It should be noted that since the training pictures related to road surface markings are captured by a dashcam or a car DVR, the image recognition model (M) is trained for identifying features of appearances of road surface markings on roads from a camera angle and from a shooting distance of the dashcam or the car DVR. In this way, for an image or a video that shows at least one road surface marking, the image recognition model (M) that has been trained up can be utilized to identify the road surface marking for defining a lane in the image or the video. Since realizing the image recognition model (M) by using machine learning techniques has been well known to one skilled in the relevant art, detailed explanation of the same is omitted herein for the sake of brevity. In addition, implementation of the image recognition model (M) is not limited to the disclosure herein and may vary in other embodiments.

The processor 11 is configured to determine, by using the image recognition model (M), a distance between the subject vehicle and a nearby vehicle based on vehicle-size information related to the nearby vehicle contained in parameter(s) of the image recognition model (M), a size of pixels that are related to one of features of appearance of the nearby vehicle in an image data of a video recorded by the recording device 13, a focal length of the recording device 13, and a size of an image sensor of the recording device 13. In one embodiment, the image recognition model (M) is trained based on a plurality of training images that are related to various types of large-size vehicles and that are captured by a depth camera, so as to allow the image recognition model (M) to be utilized to determine a distance between the subject vehicle and a large-size vehicle. Since implementation of determining a distance between two vehicles based on two-dimensional images has been well known to one skilled in the relevant art, detailed explanation of the same is omitted herein for the sake of brevity.

Figure 2A:
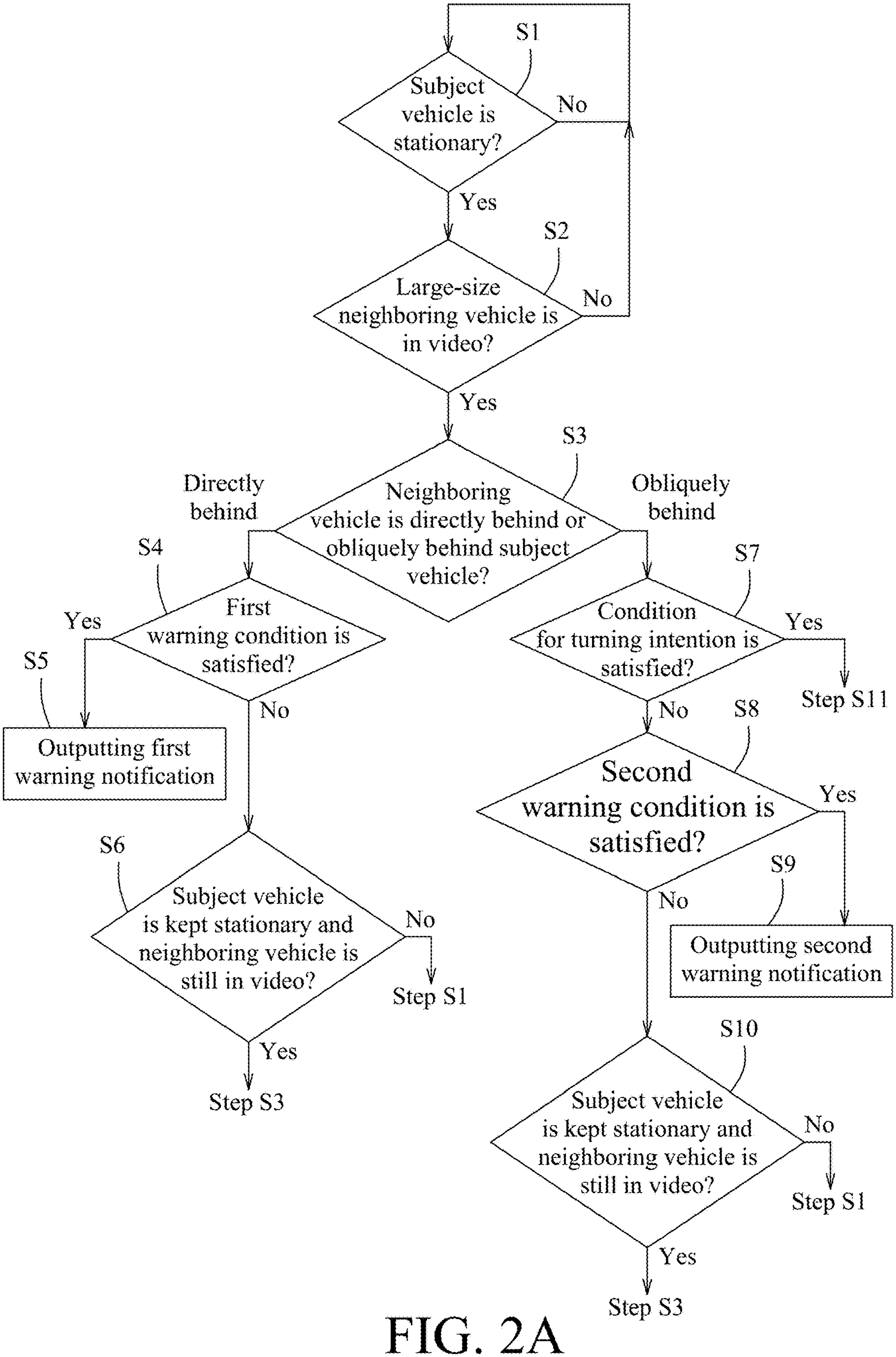
FIGS. 2A and 2B cooperatively illustrates a flow chart of a collision warning method according to an embodiment of the disclosure.
Figure 2B:
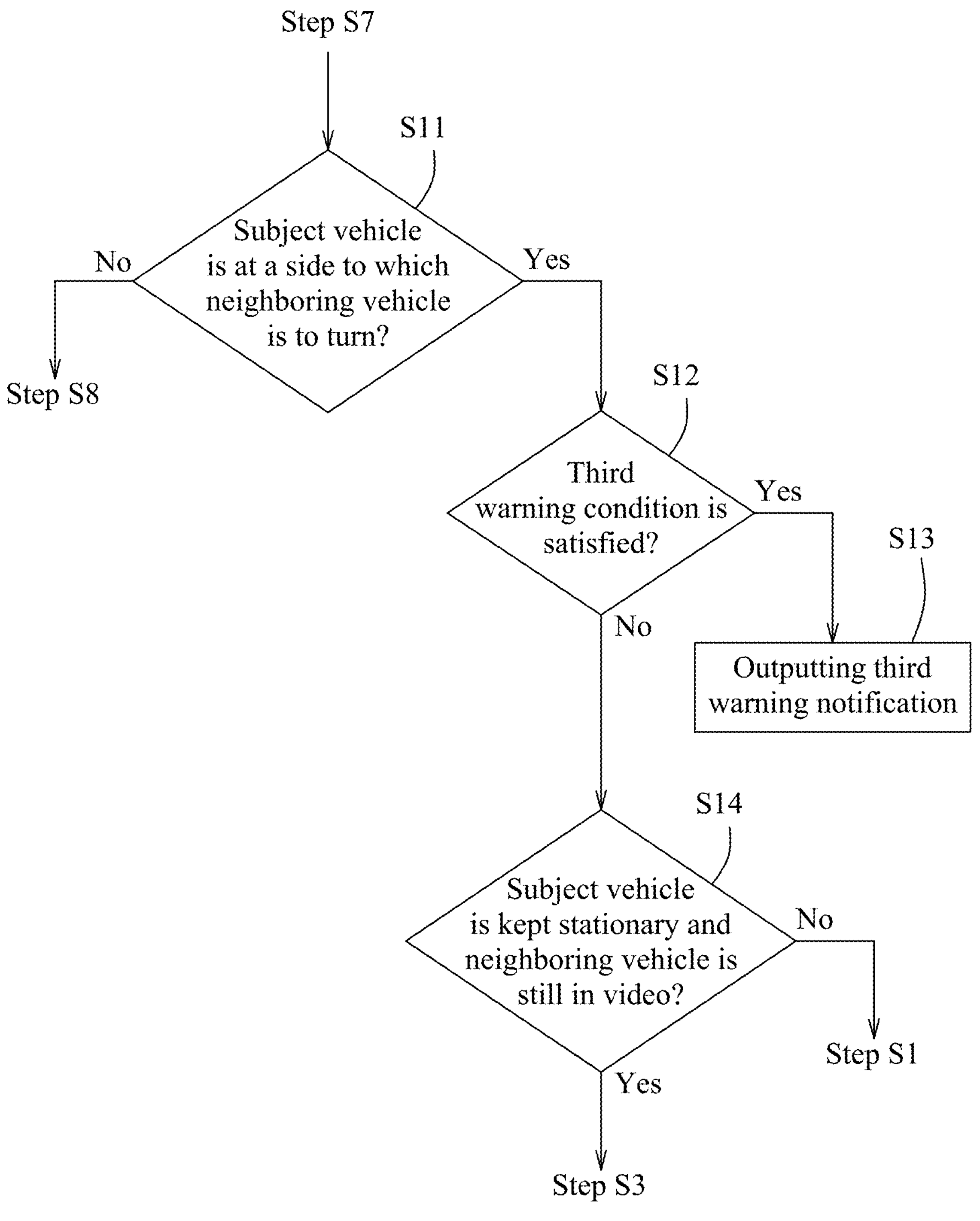

Referring to FIGS. 2A and 2B, an embodiment of a collision warning method according to the disclosure is illustrated. The collision warning method is to be implemented by the collision warning system 1 that is previously described. It is worth to note that before executing the collision warning method, the processor 11 of the collision warning system 1 may refer to the vehicle-size reference dataset (L) for obtaining data related to a profile and a size of the subject vehicle. The collision warning method includes steps S1 to S14 delineated below.

In step S1, the processor 11 determines whether the subject vehicle is stationary (e.g., the subject vehicle is waiting at a traffic light). In response to determining that the subject vehicle is not stationary (i.e., the subject vehicle is moving), a procedure flow of the method returns back to step S1 when a preset delay time (e.g., 10 seconds) has elapsed. On the other hand, in response to determining that the subject vehicle is stationary, the procedure flow proceeds to step S2.

Specifically, the processor 11 controls the recording device 13 to start recording to generate a video, and obtains the video generated by the recording device 13. Since image data of the video shows a real-time view behind the subject vehicle, the processor 11 is capable of determining whether the subject vehicle is stationary based on the image data of the video. In one embodiment, the processor 11 is electrically connected to an activity sensor (e.g., an accelerometer) that is configured to detect activity (e.g., acceleration) of the subject vehicle and to generate sensor data based on detection, and the processor 11 determines whether the subject vehicle is stationary based on the sensor data. It should be noted that implementation of determining whether the subject vehicle is stationary is not limited to the disclosure herein and may vary in other embodiments.

In step S2, the processor 11 utilizes the image recognition model (M) to perform image recognition on the image data of the video, and determines whether there is a neighboring vehicle that is a large-size vehicle in the video based on the image data. In response to determining that there is no neighboring vehicle that is a large-size vehicle in the video, the procedure flow returns back to step S1 when the preset delay time has elapsed. Otherwise, in response to determining that there is a neighboring vehicle that is a large-size vehicle in the video, the procedure flow proceeds to step S3 and the processor 11 starts a blind spot detection procedure. In one embodiment, the blind spot detection procedure is continued for a preset time period (e.g., twelve seconds). In one embodiment, the blind spot detection procedure is continued until the neighboring vehicle eventually disappears in the video.

It should be noted that in one embodiment, step S1 is omitted, and the procedure flow starts from step S2. That is to say, step S2 is repeated until it is determined that there is a neighboring vehicle that is a large-size vehicle in the video.

In step S3, the processor 11 determines, by utilizing the image recognition model (M) based on the image data of the video, whether the neighboring vehicle is directly behind the subject vehicle or obliquely behind the subject vehicle (i.e., at a rear left side or at a rear right side of the subject vehicle). In response to determining that the neighboring vehicle is directly behind the subject vehicle, the procedure flow proceeds to step S4. Otherwise, in response to determining that the neighboring vehicle is obliquely behind the subject vehicle, the procedure flow proceeds to step S7. It is worth to note that a situation where the neighboring vehicle is obliquely behind the subject vehicle means that the neighboring vehicle may move forward to be side-by-side with the subject vehicle.

Specifically, the processor 11 defines at least one lane according to at least one road surface marking in the video by utilizing the image recognition model (M) based on the image data, and determines whether the subject vehicle and the neighboring vehicle are in the same lane among the at least one lane. In response to determining that the subject vehicle and the neighboring vehicle are in the same lane among the at least one lane, the processor 11 determines that the neighboring vehicle is directly behind the subject vehicle. Otherwise, in response to determining that the subject vehicle and the neighboring vehicle are not in the same lane among the at least one lane, the processor 11 determines that the neighboring vehicle is obliquely behind the subject vehicle. However, implementation of determining whether the neighboring vehicle is directly behind the subject vehicle or obliquely behind the subject vehicle is not limited to the disclosure herein and may vary in other embodiments.

For example, in one embodiment, the processor 11 determines whether the neighboring vehicle is directly behind the subject vehicle or obliquely behind the subject vehicle based on a position of the neighboring vehicle in a picture shown in the image data of the video. Specifically, the processor 11 divides the picture into a left region, a middle region and a right region that are parallel to each other in a horizontal direction. Next, the processor 11 determines in which one of the left region, the middle region and the right region does a center of a front portion of the neighboring vehicle fall. When it is determined that the center of the front portion of the neighboring vehicle falls in the middle region, the processor 11 determines that the neighboring vehicle is directly behind the subject vehicle. Oppositely, when it is determined that the center of the front portion of the neighboring vehicle falls in either one of the left region and the right region, the processor 11 determines that the neighboring vehicle is obliquely behind the subject vehicle.

In step S4, the processor 11 determines whether a first warning condition related to the forward-backward distance threshold (P1) is satisfied based on the image data of the video. In particular, the processor 11 continuously determines a forward-backward distance between the subject vehicle and the neighboring vehicle (e.g., a distance from a rear of the subject vehicle to a front of the neighboring vehicle in a forward direction of the subject vehicle), the first warning condition is that the forward-backward distance is not greater than the forward-backward distance threshold (P1). In response to determining that the first warning condition is satisfied, the procedure flow proceeds to step S5. Contrarily, in response to determining that the first warning condition is not satisfied, the procedure flow proceeds to step S6. It is worth to note that a situation that the first warning condition is satisfied means that the subject vehicle is in proximity to the neighboring vehicle, and is probably within a blind spot ahead of the neighboring vehicle. A distance between the subject vehicle and the neighboring vehicle can be utilized to determine whether the subject vehicle is within the blind spot around the neighboring vehicle, and may be utilized to determine an area of a part of the blind spot occupied by the subject vehicle. However, it should be noted that a situation that the first warning condition is not satisfied simply means that the subject vehicle is probably not within the blind spot ahead of the neighboring vehicle.

In step S5, the processor 11 controls the output device 14 to output a first warning notification, so as to notify the driver of the subject vehicle. The first warning notification is exemplarily vibrations, but is not limited thereto. In this way, the subject vehicle may be kept away from the blind spot ahead of the neighboring vehicle.

In step S6, the processor 11 determines whether the subject vehicle is kept stationary and the neighboring vehicle is still in the video. It should be noted that a situation that a part of the neighboring vehicle appears in the video (i.e., the neighboring vehicle can be recorded by the recording device 13) is regarded as a situation where the neighboring vehicle is in the video. In response to determining that the subject vehicle is kept stationary and the neighboring vehicle is still in the video, the procedure flow returns to step S3. Otherwise, in response to determining that either the subject vehicle is moving or the neighboring vehicle is no longer in the video, the procedure flow returns to step S1.

In step S7, the processor 11 determines whether a condition for turning intention is satisfied. In response to determining that the condition for turning intention is not satisfied, the procedure flow proceeds to step S8. On the other hand, in response to determining that the condition for turning intention is satisfied, the procedure flow proceeds to step S11.

Particularly, in one embodiment, the condition for turning intention is that only one of turn signals of the neighboring vehicle is flashing, and the side to which the neighboring vehicle is to turn corresponds to the one of the turn signals of the neighboring vehicle that is flashing. More specifically, the neighboring vehicle includes, in the front of the neighboring vehicle, a left turn signal that is configured to flash to indicate that the neighboring vehicle is going to turn left, and a right turn signal that is configured to flash to indicate that the neighboring vehicle is going to turn right. The image data of the video may show both of the left turn signal and the right turn signal of the neighboring vehicle. The processor 11 determines which one of the left turn signal and the right turn signal is flashing based on the image data of the video, and determines that the neighboring vehicle is going to turn left (i.e., a predicted side to which the neighboring vehicle is to turn is the left side of the neighboring vehicle) in response to determining that only the left turn signal is flashing in the video, and that the neighboring vehicle is going to turn right (i.e., the predicted side to which the neighboring vehicle is to turn is the right side of the neighboring vehicle) in response to determining that only the right turn signal is flashing in the video.

In one embodiment, the processor 11 performs speech recognition on the audio data of the video to obtain at least one keyword, and the condition for turning intention is that said at least one keyword indicates that the neighboring vehicle is to turn to the predicted side (i.e., the left or the right of the neighboring vehicle), and the side to which the neighboring vehicle is to turn corresponds to the predicted side. For example, a part of large-size vehicles may sound, via speakers, alerts like "Attention please, car is turning right (left)" or "Turn right (left), please be careful." The processor 11 would perform speech recognition on the audio data of the video to obtain keywords such as "turn right" or "turn left," and determines that the predicted side is the right side or the left side, respectively.

It should be noted that the processor 11 determines whether the condition for turning intention is satisfied based on one of the image data, the audio data, and a combination thereof.

In step S8, the processor 11 generates, based on the vehicle-size reference dataset (L) and the image data of the video, a two-dimensional top-view image that presents a relative position between the subject vehicle and the neighboring vehicle. Specifically, the two-dimensional top-view image presents a subject-vehicle pattern and a neighboring-vehicle pattern, wherein the subject-vehicle pattern is formed by scaling down the subject vehicle and the neighboring-vehicle pattern is formed by scaling down the neighboring vehicle. It is worth to note that data related to profiles and sizes of the subject vehicle and the neighboring vehicle can be obtained by referring to the vehicle-size reference dataset (L). Because the relative position between the subject vehicle and the neighboring vehicle in the two-dimensional top-view image faithfully reflects an actual distance between the subject vehicle and the neighboring vehicle in the real world, information about a relative distance and a relative direction between the subject vehicle and the neighboring vehicle can be determined according to the two-dimensional top-view image. Since implementation of generating the two-dimensional top-view image based on the vehicle-size reference dataset (L) and the image data of the video has been well known to one skilled in the relevant art, e.g., techniques of coordinate transformation and projection may be utilized, detailed explanation of the same is omitted herein for the sake of brevity.

Then, the processor 11 selects, based on features of appearance of the neighboring vehicle, one of the blind-spot distribution patterns (K) that matches the neighboring vehicle, overlaps said one of the blind-spot distribution patterns (K) thus selected on the two-dimensional top-view image at a position of the two-dimensional top-view image that corresponds to the neighboring vehicle (i.e., around the neighboring-vehicle pattern in the two-dimensional top-view image), and determines whether a second warning condition is satisfied based on the two-dimensional top-view image with said one of the blind-spot distribution patterns (K) overlapped thereon. It is worth to note that the two-dimensional top-view image with said one of the blind-spot distribution patterns (K) overlapped thereon faithfully reflects a relative position between the subject vehicle and a blind spot around the neighboring vehicle in the real world. The second warning condition is related to the first left-right distance threshold (P2A) and the first blind-spot coverage threshold (P3A). Specifically, the processor 11 continuously determines a left-right distance between the subject vehicle and the neighboring vehicle (e.g., a distance from a center of the subject vehicle to a center of the neighboring vehicle in a lateral direction that is perpendicular to the forward direction of the subject vehicle). Moreover, the processor 11 continuously determines, based on the two-dimensional top-view image with said one of the blind-spot distribution patterns (K) overlapped thereon, an area of a part of a blind spot around the neighboring vehicle occupied by the subject vehicle, and continuously calculates a coverage ratio of the area thus determined to an area of the whole of the blind spot. The second warning condition is that the left-right distance thus determined is not greater than the first left-right distance threshold (P2A) (i.e., 2 meters) and that the coverage ratio is not smaller than the first blind-spot coverage threshold (P3A) (i.e., 60%). In response to determining that the second warning condition is satisfied, the procedure flow proceeds to step S9. On the other hand, in response to determining that the second warning condition is not satisfied, the procedure flow proceeds to step S10. It is worth to note that determination as to whether the second warning condition is satisfied is made under either a condition that the subject vehicle is stationary or a condition that the subject vehicle is not stationary (i.e., is moving). It is worth to note that a situation that the second warning condition is satisfied means that the subject vehicle is in proximity to the neighboring vehicle, and is probably within a blind spot to the left or to the right of the neighboring vehicle. However, it should be noted that a situation that the second warning condition is not satisfied simply means that the subject vehicle is probably not within the blind spot to the left or to the right of the neighboring vehicle.

In step S9, the processor 11 controls the output device 14 to output a second warning notification. The second warning notification is exemplarily vibrations, but is not limited thereto. In this way, the subject vehicle may be kept away from the blind spot to the left or to the right of the neighboring vehicle.

In step S10, the processor 11 determines whether the subject vehicle is kept stationary and the neighboring vehicle is still in the video. It should be noted that a situation that a part of the neighboring vehicle appears in the video (i.e., the neighboring vehicle can be recorded by the recording device 13) is regarded as a situation where the neighboring vehicle is in the video. In response to determining that the subject vehicle is kept stationary and the neighboring vehicle is still in the video, the procedure flow returns to step S3. Otherwise, in response to determining that either the subject vehicle is moving or the neighboring vehicle is no longer in the video, the procedure flow returns to step S1.

In step S11, the processor 11 determines whether the subject vehicle is at a side to which the neighboring vehicle is to turn. In response to determining that the subject vehicle is not at the side to which the neighboring vehicle is to turn, the procedure flow proceeds to step S8. Otherwise, in response to determining that the subject vehicle is at the side to which the neighboring vehicle is to turn, the procedure flow proceeds to step S12. For example, in a scenario where a side to which the neighboring vehicle is to turn is the right side of the neighboring vehicle, the processor 11 determines that the subject vehicle is at the side to which the neighboring vehicle is to turn when it is determined based on the image data of the video that the neighboring vehicle is at the rear left side or a left side of the subject vehicle (i.e., the subject vehicle is at a front right side or the right side of the neighboring vehicle). Similarly, in a scenario where a side to which the neighboring vehicle is to turn is the left side of the neighboring vehicle, the processor 11 determines that the subject vehicle is at the side to which the neighboring vehicle is to turn when it is determined based on the image data of the video that the neighboring vehicle is at the rear right side or a right side of the subject vehicle (i.e., the subject vehicle is at a front left side or the left side of the neighboring vehicle).

It is worth to note that a situation that the condition for turning intention is satisfied but the subject vehicle is not at the side to which the neighboring vehicle is to turn implies that the neighboring vehicle may have moved forward to a lateral side (i.e., the left side or the right side) of the subject vehicle and may have most likely turned to a side away from the subject vehicle. In other words, when the neighboring vehicle keeps moving forward, the subject vehicle would probably enter into a blind spot around the neighboring vehicle but would probably not enter into a dangerous area where the neighboring vehicle would crash into the subject vehicle due to a difference of radius between inner wheels of the neighboring vehicle. Alternatively, a situation that the condition for turning intention is satisfied and the subject vehicle is at the side to which the neighboring vehicle is to turn implies that the neighboring vehicle may have moved forward to the lateral side of the subject vehicle and most likely may have turned to a side toward the subject vehicle. In other words, when the neighboring vehicle keeps moving forward, the subject vehicle would probably not only enter into the blind spot around the neighboring vehicle but also probably enter into the dangerous area where the neighboring vehicle would crash into the subject vehicle due to the difference of radius between inner wheels of the neighboring vehicle.

In step S12, the processor 11 generates the two-dimensional top-view image based on the vehicle-size reference dataset (L) and the image data of the video, selects one of the blind-spot distribution patterns (K) that matches the neighboring vehicle based on features of appearance of the neighboring vehicle, and overlaps said one of the blind-spot distribution patterns (K) thus selected on the two-dimensional top-view image at a position of the two-dimensional top-view image that corresponds to the neighboring vehicle. Subsequently, the processor 11 determines whether a third warning condition related to the second left-right distance threshold (P2B) and the second blind-spot coverage threshold (P3B) is satisfied based on the two-dimensional top-view image with said one of the blind-spot distribution patterns (K) overlapped thereon. In particular, the processor 11 continuously determines the left-right distance between the subject vehicle and the neighboring vehicle, continuously determines an area of a part of a blind spot around the neighboring vehicle occupied by the subject vehicle based on the two-dimensional top-view image with said one of the blind-spot distribution patterns (K) overlapped thereon, and continuously calculates a coverage ratio of the area thus determined to an area of the whole of the blind spot. The third warning condition is that the left-right distance thus determined is not greater than the second left-right distance threshold (P2B) (i.e., 4 meters) and that the coverage ratio is not smaller than the second blind-spot coverage threshold (P3B) (i.e., 40%). In response to determining that the third warning condition is satisfied, the procedure flow proceeds to step S13. Otherwise, in response to determining that the third warning condition is not satisfied, the procedure flow proceeds to step S14. It is worth to note that determination as to whether the third warning condition is satisfied is made under either a condition that the subject vehicle is stationary or a condition that the subject vehicle is not stationary (i.e., is moving). It is worth to note that a situation that the third warning condition is satisfied means that it is highly probable that the subject vehicle is within the blind spot to the left or to the right of the neighboring vehicle and within the dangerous area where the neighboring vehicle would crash into the subject vehicle due to the difference of radius between inner wheels of the neighboring vehicle. Contrarily, a situation that the third warning condition is not satisfied means that the subject vehicle is probably not within the blind spot to the left or to the right of the neighboring vehicle.

In step S13, the processor 11 controls the output device 14 to output a third warning notification in response to determining that the third warning condition is satisfied. The third warning notification is exemplarily vibrations, but is not limited thereto. In one embodiment, the intensity of vibrations of the third warning notification is greater than that of the second warning notification. In one embodiment, a duration of vibrations of the third warning notification is longer than that of the second warning notification. In this way, the third warning notification may be more effective than the second warning notification in an aspect of notifying the driver of the subject vehicle. In one embodiment where the output device 14 includes a speaker, the third warning notification may additionally include sounds for enhancing effect of warning. Since the second left-right distance threshold (P2B) is greater than the first left-right distance threshold (P2A) and the second blind-spot coverage threshold (P3B) is smaller than the first blind-spot coverage threshold (P3A), the collision warning system 1 according to the disclosure is more sensitive to make a determination related to the blind spot around the neighboring vehicle in step S13 than in step S8, and thus the driver of the subject vehicle may be notified by the collision warning system 1 as soon as possible. In this way, the subject vehicle may be kept away from the blind spot to the left or to the right of the neighboring vehicle and kept away from the dangerous area where the neighboring vehicle would crash into the subject vehicle due to the difference of radius between inner wheels of the neighboring vehicle.

In step S14, the processor 11 determines whether the subject vehicle is kept stationary and the neighboring vehicle is still in the video. It should be noted that a situation that a part of the neighboring vehicle appears in the video (i.e., the neighboring vehicle can be recorded by the recording device 13) is regarded as that the neighboring vehicle is in the video. In response to determining that the subject vehicle is kept stationary and the neighboring vehicle is still in the video, the procedure flow returns to step S3. Otherwise, in response to determining that either the subject vehicle is moving or the neighboring vehicle is no longer in the video, the procedure flow returns to step S1.

It should be note that an order of steps of the collision warning method is not limited to the disclosure herein and may vary in other embodiments.

In one embodiment where the storage 12 stores a single left-right distance threshold (P2), step S7 is omitted and the procedure flow proceeds from step S3 directly to step S8 in response to determining that the neighboring vehicle is obliquely behind the subject vehicle. In other words, steps S11 to S14 are omitted, too.

In one embodiment, in steps S6, S10 and S14, the processor 11 only determines whether the subject vehicle is kept stationary. That is to say, the processor 11 does not determine whether the neighboring vehicle is still in the video. In response to determining that the subject vehicle is kept stationary, the procedure flow returns to step S3. Otherwise, in response to determining that the subject vehicle is not kept stationary, the procedure flow returns to step S1.

Conventionally, a blind spot for a large-size vehicle may be defined in advance as a specific spatial range that is extended from a specific component (e.g., a rearview mirror) of the large-size vehicle. A relative position between a small-size vehicle and a large-size vehicle can be roughly determined based on a result of recording (e.g., a video) obtained by using a dashcam or a car DVR mounted on the small-size vehicle. However, the relative position thus determined may be not accurate enough to correctly determine whether the small-size vehicle is within a blind spot around the large-size vehicle. Comparatively, for the collision warning system 1 and the collision warning method according to the disclosure, one of various criteria is selected based on whether the neighboring vehicle is directly behind or obliquely behind the subject vehicle for preventing collisions between the neighboring vehicle and the subject vehicle. In particular, when the neighboring vehicle is directly behind the subject vehicle, the determination as to whether the subject vehicle is within a blind spot around the neighboring vehicle and whether a safety distance is kept between the neighboring vehicle and the subject vehicle are made based on the forward-backward distance threshold (P1). When the neighboring vehicle is obliquely behind the subject vehicle, the processor 11 generates the two-dimensional top-view image based on the vehicle-size reference dataset (L) and the image data of the video, overlaps one of the blind-spot distribution patterns (K) that matches the neighboring vehicle on the two-dimensional top-view image, and determines whether the subject vehicle is within a blind spot around the neighboring vehicle and whether a safety distance is kept between the neighboring vehicle and the subject vehicle based on said at least one left-right distance threshold (P2), said at least one blind-spot coverage threshold, and the two-dimensional top-view image with said one of the blind-spot distribution patterns (K) overlapped thereon. Thereafter, the processor 11 controls the output device 14 to output warning notifications to notifying the driver of the subject vehicle based on results of the abovementioned determinations. Since whether the subject vehicle is within a blind spot around the neighboring vehicle may be accurately and reliably determined by using the collision warning system 1 and the collision warning method according to the disclosure, collisions between the subject vehicle and the neighboring vehicle may be effectively prevented.

In one embodiment, the collision warning method is to be implemented by the collision warning system 1 that further includes a global positioning system (GPS) device (not shown) which is electrically connected to the processor 11. The storage 12 stores said at least one left-right distance threshold (P2) and said at least one blind-spot coverage threshold. Since the collision warning system 1 in this embodiment is similar to the embodiment of the collision warning system 1 shown in FIG. 1, detailed explanation of the same is omitted herein for the sake of brevity. In this embodiment, the collision warning method at least includes first to fourth steps.

In the first step of this embodiment (similar to step S2 in FIG. 2A), the processor 11 determines whether there is a neighboring vehicle that is a large-size vehicle in the video based on the image data. In response to determining that there is a neighboring vehicle that is a large-size vehicle in the video, a procedure flow of the collision warning method proceeds to the second step where the processor 11 starts the blind spot detection procedure. In one embodiment, the blind spot detection procedure is continued for a preset time period. In one embodiment, the blind spot detection procedure is continued until the neighboring vehicle eventually disappears in the video.

In the second step (similar to step S3 in FIG. 2A), the processor 11 determines whether the neighboring vehicle is obliquely behind the subject vehicle based on the image data of the video. In response to determining that the neighboring vehicle is obliquely behind the subject vehicle, the procedure flow proceeds to the third step.

In the third step (similar to step S8 in FIG. 2A), the processor 11 obtains, via the GPS device, GPS coordinates of the subject vehicle. The processor 11 determines, based on the image data of the video, a relative direction between the subject vehicle and the neighboring vehicle and a relative distance between the subject vehicle and the neighboring vehicle. It is worth to note that positions respectively of the subject vehicle and the neighboring vehicle can be expressed respectively as two points in a Cartesian coordinate system in a plane (i.e., a two-dimensional coordinate system), and each of the two points is specified by a pair of real numbers (i.e., coordinates) that represent signed distances from the point respectively to an x-axis and a y-axis of the Cartesian coordinate system. A procedure to estimate the coordinates for the subject vehicle and the neighboring vehicle involves recognizing environmental features (e.g., lane lines, license plates and so on) by performing image recognition on the image data of the video. Then, the relative distance between the subject vehicle and the neighboring vehicle can be determined based on the coordinates for the subject vehicle and the neighboring vehicle. Further, a change rate of the relative distance between the subject vehicle and the neighboring vehicle can be determined by taking time into account. The processor 11 determines whether the second warning condition is satisfied based on the relative direction, the relative distance and the GPS coordinates of the subject vehicle, wherein the second warning condition is related to said at least one left-right distance threshold (P2) and said at least one blind-spot coverage threshold. In response to determining that the second warning condition is satisfied, the procedure flow proceeds to the fourth step. It is worth to note that the GPS coordinates of the subject vehicle is utilized to determine a reference point on a front portion of the subject vehicle, and the reference point on the front portion of the subject vehicle may improve accuracy of determining whether the subject vehicle is within the blind spot around the neighboring vehicle, and thereby may improve accuracy of determining whether the second warning condition is satisfied. Moreover, the GPS coordinates of the subject vehicle can be utilized to determine whether or not the subject vehicle is still (i.e., not moving).

In the fourth step (similar to step S9 in FIG. 2A), the processor 11 controls the output device 14 to output the second warning notification.

To sum up, for the collision warning system 1 and the collision warning method according to the disclosure, determinations related to probability of collision between a subject vehicle and a neighboring vehicle while the subject vehicle is not moving are made based on the video related to the view behind the subject vehicle, and warning notifications are outputted to notify the driver of the subject vehicle when it is determined that a collision between the subject vehicle and the neighboring vehicle will probably occur. In this way, probability of collision between the subject vehicle and the neighboring vehicle due to that the subject vehicle being within a blind spot around the neighboring vehicle may be reduced. In addition, probability that the neighboring vehicle crashes into the subject vehicle due to the difference of radius between inner wheels of the neighboring vehicle may be reduced as well. Thus, severe traffic accidents due to blind spots around a large-sized vehicle may be prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A collision warning method, to be implemented by a collision warning system that is adapted to be used on a subject vehicle, the collision warning system including a storage, a recording device, an output device and a processor electrically connected to the storage, the recording device and the output device, the storage storing at least one left-right distance threshold and at least one blind-spot coverage threshold, the recording device being disposed on the subject vehicle, and recording a view behind the subject vehicle to obtain a video that contains image data, the method comprising:

- the processor determining whether there is a neighboring vehicle that is a large-size vehicle in the video based on the image data;
- in response to determining that there is the neighboring vehicle that is the large-size vehicle in the video, the processor determining whether the neighboring vehicle is obliquely behind the subject vehicle based on the image data of the video; and
- in response to determining that the neighboring vehicle is obliquely behind the subject vehicle,
  - the processor generating, based on the image data of the video, a two-dimensional top-view image that presents a relative position between the subject vehicle and the neighboring vehicle,
  - the processor overlapping a blind-spot distribution pattern on the two-dimensional top-view image at a position of the two-dimensional top-view image that corresponds to the neighboring vehicle,
  - the processor determining, based on the image data of the video, a relative distance between the subject vehicle and the neighboring vehicle,
  - the processor determining whether a second warning condition is satisfied based on the relative distance of the subject vehicle, the second warning condition being related to said at least one left-right distance threshold and said at least one blind-spot coverage threshold, and
  - the processor controlling the output device to output a second warning notification in response to determining that the second warning condition is satisfied.

2. The collision warning method as claimed in claim 1, further comprising, in response to determining that there is the neighboring vehicle that is the large-size vehicle in the video, the processor starting a blind spot detection procedure.

3. The collision warning method as claimed in claim 2, wherein the blind spot detection procedure is continued for a preset time period.

4. The collision warning method as claimed in claim 2, wherein the blind spot detection procedure is continued until the neighboring vehicle eventually disappears in the video.

5. A collision warning method, to be implemented by a collision warning system that is adapted to be used on a subject vehicle, the collision warning system including a storage, a recording device, an output device and a processor electrically connected to the storage, the recording device and the output device, the storage storing a forward-backward distance threshold, at least one left-right distance threshold, at least one blind-spot coverage threshold, a plurality of blind-spot distribution patterns and a vehicle-size reference dataset, the recording device being disposed on the subject vehicle, and recording a view behind the subject vehicle to obtain a video that contains image data, the method comprising:

- the processor determining whether there is a neighboring vehicle that is a large-size vehicle in the video based on the image data;
- in response to determining that there is the neighboring vehicle that is the large-size vehicle in the video, the processor determining whether the neighboring vehicle is directly behind the subject vehicle or obliquely behind the subject vehicle based on the image data of the video;
- in response to determining that the neighboring vehicle is directly behind the subject vehicle, the processor determining whether a first warning condition related to the forward-backward distance threshold is satisfied based on the image data of the video, and controlling the output device to output a first warning notification in response to determining that the first warning condition is satisfied; and
- in response to determining that the neighboring vehicle is obliquely behind the subject vehicle,
  - the processor generating, based on the vehicle-size reference dataset and the image data of the video, a two-dimensional top-view image that presents a relative position between the subject vehicle and the neighboring vehicle,
  - the processor selecting one of the blind-spot distribution patterns that matches the neighboring vehicle,
  - the processor overlapping said one of the blind-spot distribution patterns thus selected on the two-dimensional top-view image at a position of the two-dimensional top-view image that corresponds to the neighboring vehicle,
  - the processor determining whether a second warning condition is satisfied based on the two-dimensional top-view image with said one of the blind-spot distribution patterns overlapped thereon, the second warning condition being related to said at least one left-right distance threshold and said at least one blind-spot coverage threshold, and
  - the processor controlling the output device to output a second warning notification in response to determining that the second warning condition is satisfied.

6. The collision warning method as claimed in claim 5, wherein the processor determining whether the neighboring vehicle is directly behind the subject vehicle or obliquely behind the subject vehicle is to:

- define at least one lane according to at least one road surface marking in the video based on the image data;
- determine whether the subject vehicle and the neighboring vehicle are in the same lane among the at least one lane;
- determine that the neighboring vehicle is directly behind the subject vehicle in response to determining that the subject vehicle and the neighboring vehicle are in the same lane among the at least one lane; and
- determine that the neighboring vehicle is obliquely behind the subject vehicle in response to determining that the subject vehicle and the neighboring vehicle are not in the same lane among the at least one lane.

7. The collision warning method as claimed in claim 5, further comprising, in response to determining that there is the neighboring vehicle that is the large-size vehicle in the video, the processor starting a blind spot detection procedure.

8. The collision warning method as claimed in claim 7, wherein the blind spot detection procedure is continued for a preset time period.

9. The collision warning method as claimed in claim 7, wherein the blind spot detection procedure is continued until the neighboring vehicle eventually disappears in the video.

10. The collision warning method as claimed in claim 5, said at least one left-right distance threshold including a first left-right distance threshold and a second left-right distance threshold that is greater than the first left-right distance threshold, said at least one blind-spot coverage threshold including a first blind-spot coverage threshold and a second blind-spot coverage threshold that is less than the first blind-spot coverage threshold, the second warning condition being related to the first left-right distance threshold and the first blind-spot coverage threshold, the collision warning method further comprising, in response to determining that there is the neighboring vehicle that is the large-size vehicle in the video and that the neighboring vehicle is obliquely behind the subject vehicle:

- the processor determining whether a condition for turning intention is satisfied;
- in response to determining that the condition for turning intention is not satisfied, the processor determining whether the second warning condition is satisfied, and controlling the output device to output the second warning notification in response to determining that the second warning condition is satisfied;
- in response to determining that the condition for turning intention is satisfied, the processor determining whether the subject vehicle is at a side to which the neighboring vehicle is to turn;
- in response to determining that the subject vehicle is not at the side to which the neighboring vehicle is to turn, the processor determining whether the second warning condition is satisfied based on the image data of the video, and controlling the output device to output the second warning notification in response to determining that the second warning condition is satisfied; and
- in response to determining that the subject vehicle is at the side to which the neighboring vehicle is to turn, the processor determining whether a third warning condition related to the second left-right distance threshold and the second blind-spot coverage threshold is satisfied, and controlling the output device to output a third warning notification in response to determining that the third warning condition is satisfied.

11. The collision warning method as claimed in claim 10, wherein the condition for turning intention is that only one of turn signals of the neighboring vehicle is flashing, and the side to which the neighboring vehicle is to turn corresponds to the one of the turn signals of the neighboring vehicle that is flashing.

12. The collision warning method as claimed in claim 10, the video further containing audio data, the collision warning method further comprising:

the processor performing speech recognition on the audio data of the video to obtain at least one keyword, the condition for turning intention being that said at least one keyword indicates that the neighboring vehicle is to turn to a predicted side, and the side to which the neighboring vehicle is to turn corresponds to the predicted side.

13. A collision warning system adapted to be used on a subject vehicle, said collision warning system comprising:

a storage configured to store a forward-backward distance threshold, at least one left-right distance threshold, at least one blind-spot coverage threshold, a plurality of blind-spot distribution patterns and a vehicle-size reference dataset;

a recording device disposed on the subject vehicle, and configured to record a view behind the subject vehicle to obtain a video that contains image data;

an output device; and a processor electrically connected to said storage, said recording device and said output device, and configured to determine whether there is a neighboring vehicle that is a large-size vehicle in the video based on the image data, in response to determining that there is the neighboring vehicle that is the large-size vehicle in the video, determine whether the neighboring vehicle is directly behind the subject vehicle or obliquely behind the subject vehicle based on the image data of the video, in response to determining that the neighboring vehicle is directly behind the subject vehicle, determine whether a first warning condition related to the forward-backward distance threshold is satisfied based on the image data of the video, and control said output device to output a first warning notification in response to determining that the first warning condition is satisfied, and in response to determining that the neighboring vehicle is obliquely behind the subject vehicle, generate, based on the vehicle-size reference dataset and the image data of the video, a two-dimensional top-view image that presents a relative position between the subject vehicle and the neighboring vehicle, select one of the blind-spot distribution patterns that matches the neighboring vehicle, overlap said one of the blind-spot distribution patterns thus selected on the two-dimensional top-view image at a position of the two-dimensional top-view image that corresponds to the neighboring vehicle, determine whether a second warning condition is satisfied based on the two-dimensional top-view image with said one of the blind-spot distribution patterns overlapped thereon, the second warning condition being related to said at least one left-right distance threshold and said at least one blind-spot coverage threshold, and control said output device to output a second warning notification in response to determining that the second warning condition is satisfied.

14. The collision warning system as claimed in claim 13, wherein said processor is configured to determine whether the neighboring vehicle is directly behind the subject vehicle or obliquely behind the subject vehicle by:

defining at least one lane according to at least one road surface marking in the video based on the image data;

determining whether the subject vehicle and the neighboring vehicle are in the same lane among the at least one lane;

determining that the neighboring vehicle is directly behind the subject vehicle in response to determining that the subject vehicle and the neighboring vehicle are in the same lane among the at least one lane; and determining that the neighboring vehicle is obliquely behind the subject vehicle in response to determining that the subject vehicle and the neighboring vehicle are not in the same lane among the at least one lane.

15. The collision warning system as claimed in claim 13, wherein in response to determining that there is the neighboring vehicle that is the large-size vehicle in the video, said processor is configured to start a blind spot detection procedure.

16. The collision warning system as claimed in claim 15, wherein said processor is configured to continue the blind spot detection procedure for a preset time period.

17. The collision warning system as claimed in claim 15, wherein said processor is configured to continue the blind spot detection procedure until the neighboring vehicle eventually disappears in the video.

18. The collision warning system as claimed in claim 13, wherein said at least one left-right distance threshold includes a first left-right distance threshold and a second left-right distance threshold that is greater than the first left-right distance threshold, said at least one blind-spot coverage threshold includes a first blind-spot coverage threshold and a second blind-spot coverage threshold that is less than the first blind-spot coverage threshold, and the second warning condition is related to the first left-right distance threshold and the first blind-spot coverage threshold;

wherein, in response to determining that there is a neighboring vehicle that is a large-size vehicle in the video and that the neighboring vehicle is obliquely behind the subject vehicle, said processor is further configured to determine whether a condition for turning intention is satisfied, in response to determining that the condition for turning intention is not satisfied, determine whether the second warning condition is satisfied, and control said output device to output the second warning notification in response to determining that the second warning condition is satisfied, in response to determining that the condition for turning intention is satisfied, determine whether the subject vehicle is at a side to which the neighboring vehicle is to turn, in response to determining that the subject vehicle is not at the side to which the neighboring vehicle is to turn, determine whether the second warning condition is satisfied based on the image data of the video, and control said output device to output the second warning notification in response to determining that the second warning condition is satisfied, and in response to determining that the subject vehicle is at the side to which the neighboring vehicle is to turn, determine whether a third warning condition related to the second left-right distance threshold and the second blind-spot coverage threshold is satisfied, and control said output device to output a third warning notification in response to determining that the third warning condition is satisfied.

19. The collision warning system as claimed in claim 18, wherein the condition for turning intention is that only one of turn signals of the neighboring vehicle is flashing, and the side to which the neighboring vehicle is to turn corresponds to the one of the turn signals of the neighboring vehicle that is flashing.

20. The collision warning system as claimed in claim 18, wherein the video further contains audio data, said processor is further configured to perform speech recognition on the audio data of the video to obtain at least one keyword, the condition for turning intention is that said at least one keyword indicates that the neighboring vehicle is to turn to a predicted side, and the side to which the neighboring vehicle is to turn corresponds to the predicted side.

* * * * *